July 28, 1925. 1,547,831
A. E. SMALL
TERMINATION OF CORRUGATIONS FOR CORRUGATED METALLIC WALL ELEMENTS
Filed Oct. 19, 1922 2 Sheets-Sheet 1

Inventor
Arthur E. Small
Vinton Sisson
Attorney

July 28, 1925.  1,547,831
A. E. SMALL
TERMINATION OF CORRUGATIONS FOR CORRUGATED METALLIC WALL ELEMENTS
Filed Oct. 19, 1922   2 Sheets-Sheet 2

Inventor
Arthur E. Small
Vinton E. Sisson
Attorney

Patented July 28, 1925.

1,547,831

UNITED STATES PATENT OFFICE.

ARTHUR E. SMALL, OF CHICAGO, ILLINOIS, ASSIGNOR TO UNION METAL PRODUCTS COMPANY, OF CHICAGO, ILLINOIS, A CORPORATION OF DELAWARE.

TERMINATION OF CORRUGATIONS FOR CORRUGATED METALLIC WALL ELEMENTS.

Application filed October 19, 1922. Serial No. 595,633.

*To all whom it may concern:*

Be it known that I, ARTHUR E. SMALL, a citizen of the United States, residing in Chicago, county of Cook, and State of Illinois, have invented certain new and useful Improvements in Termination of Corrugations for Corrugated Metallic Wall Elements, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

My invention relates to the termination of corrugations used in metal structures for railway cars, formed with integral reinforcing stiffening and bracing corrugations which terminate within the edge of the plate.

The walls of railway cars are likely to be broken or otherwise injured due to the inertia thrusts and pressures caused by the shifting of the cargoes when the train starts or stops when the brakes are suddenly applied.

These thrusts may be local, tending to distort the end in some particular spot, as, for example, when a piece of lumber or some structural shape shifts lengthwise suddenly imparting a blow against the end wall of the car, or there may be a general tendency to break out the wall as a whole or tear it away from the framing.

The strength of a corrugated car wall depends on the manner in which it is applied to the car, but more particularly to the shape, size and disposition of the corrugations and the manner in which it is manufactured.

It is desirable when pressing corrugations to do so without disturbing and rupturing the fibre of the metal any more than is necessary. This is particularly so in forming the terminations of corrugations where the metal is ordinarily pressed abruptly from a flat plate into a relatively deep corrugation. It is a common occurrence in the manufacture of corrugated plates to tear or rupture the plate at the termination of the corrugation where a relatively greater stretch of the metal takes place within a short distance.

It is desirable, therefore, to design and manufacture a corrugated plate wherein the termination of the corrugation is formed as gradually as possible from the original plane of the plate.

A very common method of terminating corrugations within the margin of the sheet is to decrease it in depth and decrease it in width. This is in effect a needle point and when a single corrugation terminated in this manner is considered as a beam supported and secured at its ends it does not offer as much torsional resistance as my construction described hereinafter.

One of the objects is to provide a means of terminating corrugations within the margins of a corrugated metal wall structure for railway cars that reinforces the corrugation against torsional stresses.

Another object of my invention is to provide a means of terminating corrugations within the margins of a corrugated metal wall structure for railway cars that is practical and easy to manufacture when pressed into shape, or rolled into shape and, furthermore, would reduce the cost of manufacture.

A further object is to provide a means of terminating corrugations within the margins of a sheet metal panel used to form a wall for railway cars that disturbs the fibre of the metal as little as possible and that more gradually merges the metal from the original plane of the sheet into a corrugation.

Figure 1:
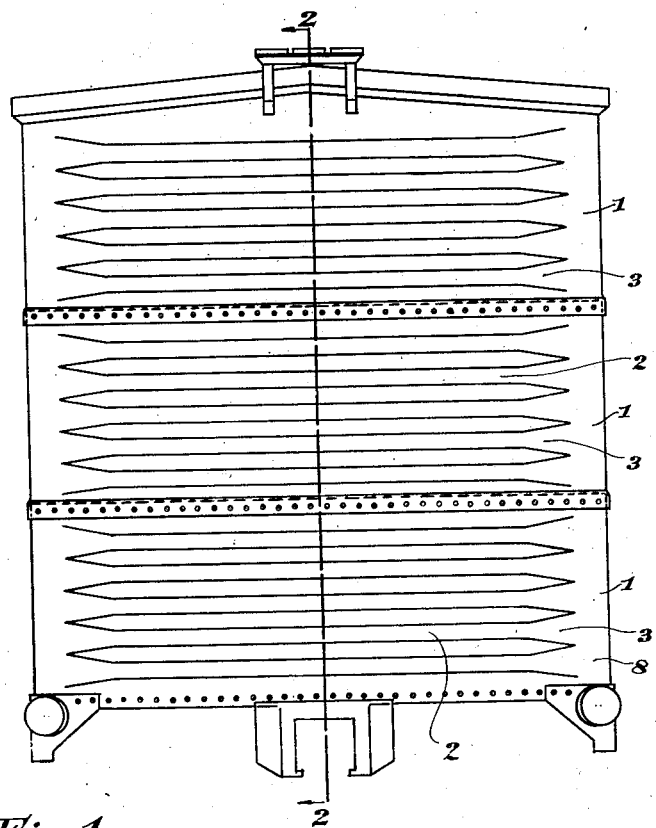
Fig. 1 is an end view of a railway car with a corrugated metal end equipped with my invention.
Figure 2:
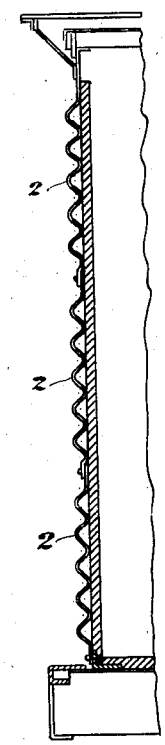
Fig. 2 is a cross section taken on line 2—2 of Fig. 1.

Like characters of reference designate like parts. Referring to Fig. 1, 1 is the corrugated plate forming the end panel of a car and secured to the car in a usual manner; 2 is the corrugation forming the principal stiffening element of the plates and 3 is the terminal portion of the corrugations 2.

Figure 3:
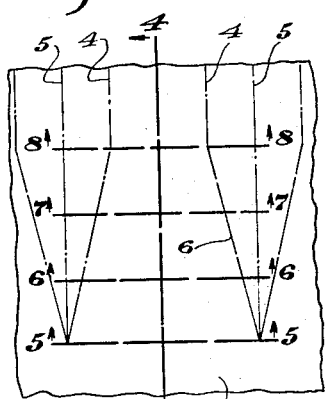
Fig. 3 is an enlarged portion of a corrugated plate showing a front view of the termination.

Referring to Fig. 3, 4 represents the neutral longitudinal axis of the convergence of the parallel corrugations; 5 represents the center line of the valley formed by the corrugations; 6 the convergence of the neutral longitudinal axis 4 of the corrugations with the center line of the valleys 5. This is the line from which the arcuated portions that form the terminations are sprung and the line at which the center lines 9 of the arches become tangent to each other.

Figure 4:
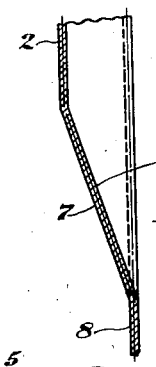
Fig. 4 is a cross section taken on line 4—4 of Fig. 3.

Referring to Fig. 4, 7 is the arcuated portion of the plate that decreases in depth while increasing in width and connects the corrugations to flat margins and the original plane of the sheet 8.

Figure 5:
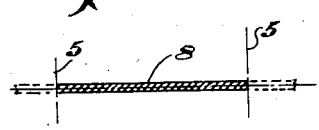
Fig. 5 is a cross section taken on line 5—5 of Fig. 3.

Fig. 5 is a cross section taken on line 5—5 of Fig. 3 and is at the junction of termination 3 and the flat marginal portions 8.

Figure 6:
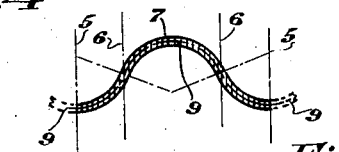
Fig. 6 is a cross section taken on line 6—6 of Fig. 3.

Fig. 6 represents a section taken on line 6—6 of Fig. 3 that is positioned one-third up the length of the termination.

Figure 7:
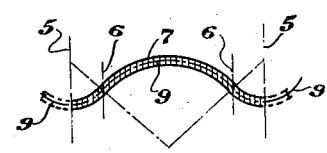
Fig. 7 is a cross section taken on line 7—7 of Fig. 3.

Fig. 7 represents a section on line 7—7 of Fig. 3 that is positioned two-thirds up the length of the termination 3.

Figure 8:
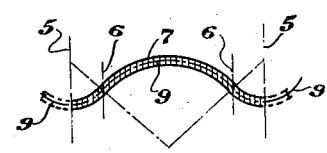
Fig. 8 is a cross section taken on line 8—8 of Fig. 4.

Fig. 8 represents a section on line 8—8 of Fig. 3 that is positioned at the junction of corrugation 2 and the termination 3.

Terminating the corrugations in this manner stabilizes the corrugations, overcomes to a greater degree the torsional stresses and merges gradually into the plane of the sheet, eliminating wrinkling and does not rupture the fibre of the metal to as great a degree as the more common termination.

Figs. 9 to 14 inclusive, similar to Figs. 3 to 8 inclusive, show a modified form of termination wherein 10 represents the convergence of the neutral longitudinal axes of the corrugation 11 with the center line of the valleys 12. This is the line from which the arcuated portions that form the termination are sprung and the line at which the center lines 13 of the arches 15 become tangent to each other or intersect. By breaking the direction of line 10, as at 14, results in more stretch of metal between line 11—11 and line 12—12 of the termination 3.

Figure 10:
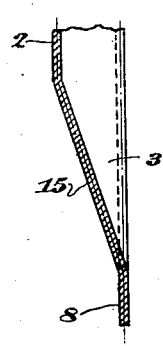
Fig. 10 is a cross section taken on line 10—10 of Fig. 9.

Referring to Fig. 10, 15 is the arcuated portion of the plate that decreases in depth while increasing in width and connects the corrugation 2 to the flat marginal portion of the plate 8.

Figure 9:
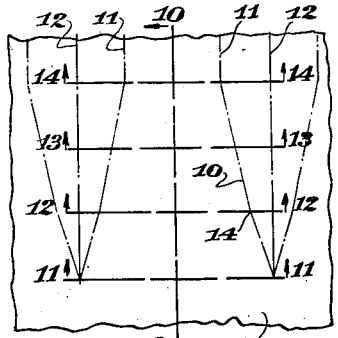
Fig. 9 is an enlarged portion of a corrugated plate showing a front view of a modified form of termination.
Figure 11:
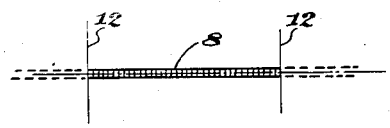
Fig. 11 is a cross section taken on line 11—11 of Fig. 9.

Fig. 11 is a cross section taken on line 11—11 of Fig. 9 and is at the junction of the termination 3 and the flat marginal portions of the sheet 8.

Figure 12:
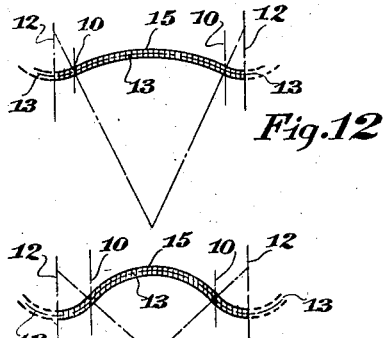
Fig. 12 is a cross section taken on line 12—12 of Fig. 9.

Fig. 12 represents a section taken on line 12—12 of Fig. 9 that is positioned one-third up the length of the termination 3.

Figure 13:
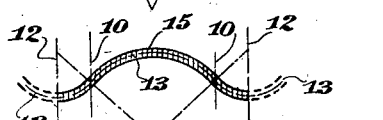
Fig. 13 is a cross section taken on line 13—13 of Fig. 9.

Fig. 13 represents a section taken on line 13—13 of Fig. 9 that is positioned two-thirds up the length of the termination 3.

Figure 14:
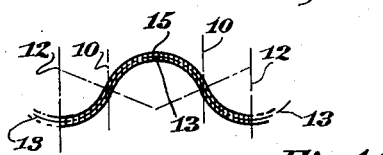
Fig. 14 is a cross section taken on line 14—14 of Fig. 9.

Fig. 14 represents a section taken on line 14—14 of Fig. 9 that is positioned at the junction of the corrugation 2 and the termination 3.

Figs. 15 to 20 inclusive represent a modified form of termination wherein 20 represents the neutral longitudinal axis of the convergence of the parallel corrugations and the termination 3. Numeral 21 represents the center line of the valley formed by the corrugations 2.

In that portion of the termination between lines 17—17 and 20—20, line 20 represents the neutral line from which the arcuated portions that form the termination are sprung and the point at which the center line 22 of the arches become tangent to each other or intersect.

Figure 16:
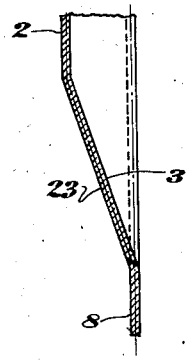
Fig. 16 is a cross section taken on line 16—16 of Fig. 15.

In Fig. 16, 23 is the arcuated portion of the plate that decreases in depth and connects the corrugation 2 to the flat marginal portion of the sheet 8.

Figure 15:
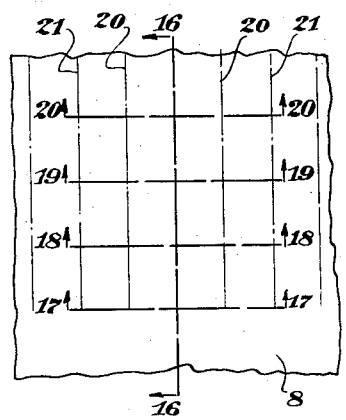
Fig. 15 is an enlarged portion of a corrugated plate showing a front view of a modified form of termination.
Figure 17:
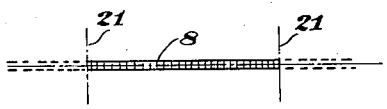
Fig. 17 is a cross section taken on line 17—17 of Fig. 15.

Fig. 17 is a cross section taken on line 17—17 of Fig. 15 located at the junction of the termination 2 and the flat marginal portions 8.

Figure 18:
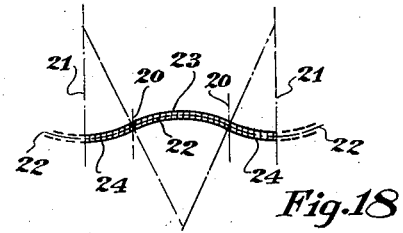
Fig. 18 is a cross section taken on line 18—18 of Fig. 15.

Fig. 18 is a cross section taken on line 18—18 of Fig. 15 that is positioned one-third up the length of the termination 3.

Figure 19:
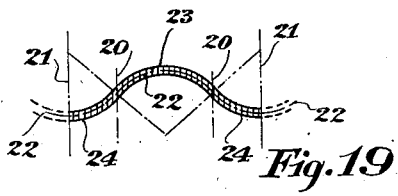
Fig. 19 is a cross section taken on line 19—19 of Fig. 15.

Fig. 19 is a cross section taken on line

19—19 of Fig. 15 positioned two-thirds up the length of the termination 3.

Figure 20:
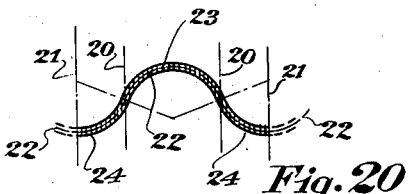
Fig. 20 is a cross section taken on line 20—20 of Fig. 15.

Fig. 20 is a cross section taken on line 20—20 of Fig. 15 positioned at the junction of the corrugation 2 and the termination 3. This modification permits the curved or arcuated portions 23 and 24 forming the termination to be of equal radii.

Figure 21:
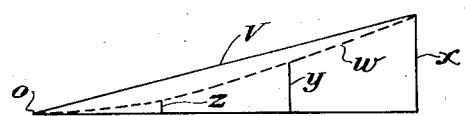
Fig. 21 is a diagram showing the gradually increasing stretch of metal compared to the stretch of metal of a more common type of termination.

Fig. 21 is a diagram showing the relative stretch of metal from the plane of the sheet into a corrugation. Referring to Fig. 3 the altitude of line X represents the total stretch of metal on line 8—8; Y represents the stretch of metal on line 7—7; Z represents the stretch of metal on line 6—6 and O represents the stretch of metal on line 5—5. Dotted line W drawn from O through Z and Y and terminating at X shows diagrammatically the stretch of metal and a line drawn through any portion of this line W perpendicular to the base represents the stretch of metal at that particular point. Line V represents the stretch of metal in the more common type of termination. The stretch of metal at O and X corresponding to lines 5—5 and 8—8 respectively, of Fig. 3, is no more nor less than in the more common type of termination; but reducing the stretch of metal between these points provides more metal to draw from in forming the corrugations at line 8—8. This reduces the power required to form the corrugation at line 8—8 and lessens the tendency to tear.

Although the figure shows a plurality of contiguous and sinuous corrugations terminated with my invention, it is understood that this particular termination is applicable to corrugations of any cross section whether contiguous or spaced apart.

What I claim is:

1. A metallic plate wall element for railway cars formed with a stiffening corrugation that extends across the plate terminating within the edge thereof having terminations for the corrugation that decrease in depth and increase in width and gradually merges into the original plane of the plate.

2. A metallic plate wall element for railway cars formed with stiffening corrugations that terminate within the edge thereof having terminations for the corrugations that decrease in depth and that gradually merge into the original plane of the plate and one another, said terminations composed of oppositely disposed curves of equal radii, tapering in depth from the corrugation into the plane of the plate.

3. A metallic plate wall element for railway cars formed with stiffening corrugations that terminate within the edges thereof, having terminations that decrease in depth from the corrugation into the plane of the plate and composed of oppositely disposed curves of equal radii, said terminations merging with one another.

4. A metallic plate wall element for railway cars formed with a plurality of corrugations, terminating within the edges thereof having terminations for said corrugations wherein said terminations are wider than the corrugations.

5. A metallic plate reinforced by integral corrugations having terminations which decrease in depth and merge into the original plane of the plate, said terminations and that part of the plate between the terminations composed entirely of curved portions that merge into each other.

6. A metallic plate reinforced by integral corrugations having terminations which decrease in depth and merge into the original plane of the plate, said terminations and that part of the plate between the terminations and also the corrugations composed entirely of curved portions that merge into each other.

7. A metallic plate reinforced by integral corrugations having terminations which decrease in depth and increase in width and merge into the original plane of the plate, said terminations composed entirely of curved portions that merge into each other.

8. A metallic plate reinforced by integral corrugations having terminations which decrease in depth and increase in width and merge into the original plane of the plate, said terminations and corrugations both composed entirely of curved portions that merge into each other.

9. A metallic plate reinforced by integral corrugations having terminations which decrease in depth and increase in width and merge into the original plane of the plate, said terminations and that part of the plate between the terminations composed entirely of curved portions that merge into each other.

10. A metallic plate reinforced by integral corrugations having terminations which decrease in depth and increase in width and merge into the original plane of the plate, said terminations and that part of the plate between the terminations and also the corrugations composed entirely of curved portions that merge into each other.

11. A metallic plate reinforced by integral corrugations having terminations of constant width which decrease in depth and merge into the original plane of the plate, said terminations composed entirely of curved portions that merge into each other.

12. A metallic plate reinforced by integral corrugations having terminations of constant width which decrease in depth and merge into the original plane of the plate, said terminations and that part of the plate between the terminations composed entirely of curved portions that merge into each other.

13. A metallic plate reinforced by integral corrugations having terminations of constant width which decrease in depth and merge into the original plane of the plate, said terminations and also the corrugations composed entirely of curved portions that merge into each other.

14. A metallic plate reinforced by integral corrugations having terminations of constant width which decrease in depth and merge into the original plane of the plate, said terminations and that part of the plate between the terminations and also the corrugations composed entirely of curved portions that merge into each other.

ARTHUR E. SMALL.